US011827208B2

(12) United States Patent
Park et al.

(10) Patent No.: US 11,827,208 B2
(45) Date of Patent: Nov. 28, 2023

(54) DRIVING GUIDE SETTING SYSTEM OF ELECTRIC OPERATING VEHICLE AND METHOD OF SETTING THE DRIVING GUIDE

(71) Applicant: HANWHA AEROSPACE CO., LTD., Changwon-si (KR)

(72) Inventors: Seong Eun Park, Changwon-si (KR); Sun Hee Choi, Changwon-si (KR)

(73) Assignee: HANWHA AEROSPACE CO., LTD., Changwon-si (KR)

( * ) Notice: Subject to any disclaimer, the term of this patent is extended or adjusted under 35 U.S.C. 154(b) by 63 days.

(21) Appl. No.: 17/462,496

(22) Filed: Aug. 31, 2021

(65) Prior Publication Data

US 2022/0203958 A1 Jun. 30, 2022

(30) Foreign Application Priority Data

Dec. 29, 2020 (KR) .................. 10-2020-0186512

(51) Int. Cl.
*B60W 20/12* (2016.01)
*B60W 20/50* (2016.01)
*B60W 10/06* (2006.01)
*B60W 10/08* (2006.01)
(Continued)

(52) U.S. Cl.
CPC ............ *B60W 20/12* (2016.01); *B60W 10/06* (2013.01); *B60W 10/08* (2013.01); *B60W 10/26* (2013.01); *B60W 20/50* (2013.01); *B60W 50/0097* (2013.01); *B60W 2510/244* (2013.01);
(Continued)

(58) Field of Classification Search
CPC ...... B60W 20/12; B60W 20/50; B60W 10/06; B60W 10/08; B60W 10/26; B60W 50/0097; B60L 1/003; B60L 1/02; B60L 11/1861; B60L 3/12; B60L 58/12
See application file for complete search history.

(56) References Cited

U.S. PATENT DOCUMENTS 8,874,293 B2 * 10/2014 Gilman ............... B60L 15/2045
701/22
9,759,572 B2 * 9/2017 Okada .................... G01C 21/34
10,139,245 B2 * 11/2018 Adachi ............... B60L 15/2045
(Continued)

FOREIGN PATENT DOCUMENTS

JP 2010-226795 A 10/2010
JP 5480441 B2 4/2014
(Continued)

*Primary Examiner* — George C Jin
(74) *Attorney, Agent, or Firm* — Sughrue Mion, PLLC (57) ABSTRACT

Provided is a system for setting a driving guide of an electrical operating vehicle. The system may include: a terrain acquisition unit configured to acquire information about a current location of the vehicle, a charging location, an existing terrain, and a current terrain; a calculation unit configured to obtain first information about the vehicle based on the information acquired by the terrain acquisition unit; a battery state estimation unit configured to estimate an amount of available battery power of the vehicle; and a distance/speed calculation unit configured to calculate a drivable distance and drivable speed for the mission vehicle based on the first information obtained by the calculation unit, the estimated amount of available battery power, and a distance from the current location to a destination of the vehicle.

20 Claims, 7 Drawing Sheets

(51) Int. Cl.
*B60W 10/26* (2006.01)
*B60W 50/00* (2006.01)

(52) U.S. Cl.
CPC ..... *B60W 2552/15* (2020.02); *B60W 2552/20* (2020.02); *B60W 2556/50* (2020.02)

(56) References Cited

U.S. PATENT DOCUMENTS

| | | | |
|---|---|---|---|
| 10,180,333 B2* | 1/2019 | Jackson | B60L 58/12 |
| 2010/0094496 A1* | 4/2010 | Hershkovitz | B60L 50/66 |
| | | | 701/22 |
| 2013/0282265 A1* | 10/2013 | Arita | B60L 1/003 |
| | | | 701/123 |
| 2020/0269719 A1* | 8/2020 | Aykol | B60L 53/30 |

FOREIGN PATENT DOCUMENTS

| | | |
|---|---|---|
| JP | 5729191 B2 | 6/2015 |
| KR | 10-1936431 B1 | 1/2019 |

\* cited by examiner

DRIVING GUIDE SETTING SYSTEM OF ELECTRIC OPERATING VEHICLE AND METHOD OF SETTING THE DRIVING GUIDE

CROSS-REFERENCE TO RELATED APPLICATION

This application claims priority from Korean Patent Application No. 10-2020-0186512, filed on Dec. 29, 2020, in the Korean Intellectual Property Office, the disclosure of which is incorporated herein by reference in its entirety.

BACKGROUND

1. Field

The disclosure relates a driving guide setting system of an electric operating vehicle capable of estimating a drivable distance and speed limit considering the return to a starting location of the electric vehicle based on various information the electric vehicle obtains, and converting the estimation results and information into data for a later use.

2. Description of the Related Art

Recently, an electric operating device, such as an electric vehicle, using an operating motor powered by a battery has been developed and used to replace automobiles using an internal combustion engine as an operating source. In the same way that a driver (or operator) performs fueling an automobile while noting a remaining amount of fuel in a fuel tank of the operating device using the internal combustion engine, a driver of an electric operating device needs to perform charging a battery of the electric operating device while noting a remaining amount of charge in the battery. Thus, the remaining amount of the battery charge is displayed on a display device of the electric operating device for the driver.

However, it is difficult for the driver to determine a drivable distance from the remaining amount of the battery charge displayed on the display device. The driver may come across a situation in which the remaining amount of the battery charge turns out insufficient before arriving at a destination. Therefore, technologies are being developed to inform the driver not only the remaining amount the battery charge but also the drivable (navigable) distance of the electric operating device, or whether driving will be possible with the currently remaining amount of the battery charge based on the drivable distance and the driving distance to the destination.

Japanese Patent Publication No. 2010-226795 discloses that a drivable (travelable) distance of an electric vehicle using a currently remaining amount of battery charge varies depending on an operating condition of an air conditioner of the electric vehicle, and the drivable distance is calculated in response to the change in the operating condition of the air conditioner. That is, power consumption of a motor generator is calculated by multiplying a current and a voltage, and a power consumption rate (so-called electricity consumption) is calculated by dividing a driving distance for a previous predetermined period by the power consumption, and further, a drivable distance in a state of the air conditioner being turned off is calculated by multiplying the remaining amount of the battery charge to the power consumption rate. Japanese Patent Publication No. 2010-226795 further disclose that a second power consumption is calculated by adding power consumption of the air conditioner to the power consumption obtained by multiplying the current and the voltage, and dividing the driving distance for the previous predetermined period by the second power consumption to calculate a second power consumption rate corresponding to a state of the air conditioner being turned on, and the remaining amount of the battery charge is multiplied by the second power consumption rate to calculate a drivable distance when the air conditioner is turned on.

Still however, drivers of the electric operating device using a battery monitors a remaining amount of battery charge in a real-time basis, and arbitrarily determines an amount of battery charge required for the electric operating device to be driven to a destination. At this time, since the required amount of charge in the battery is arbitrarily determined based on the driver's experience, there is a risk that the electric operating device is stopped from being driven against the driver's intention, or the driver stops driving the electric operating device in a concern of battery discharge even though the electric operating device can be driven a longer distance.

SUMMARY

The disclosure provides a driving guide setting system of an electric operating vehicle that can address the difficulty of arbitrarily determining whether to continue a given mission or returning before the mission is complete by checking the state of an operating source (electric battery power or a fuel amount) without guidelines for how much longer the vehicle can be driven and at what speed it should be driven while the mission is being performed, and a method setting the driving guide.

Further, the disclosure provides a driving guide setting system of an electric operating vehicle that can perform a mission considering a charging station or a charging vehicle, and a method setting the driving guide.

However, the disclosure is not restricted to the embodiments set forth herein. Various aspects of the inventive concept will become more apparent to one of ordinary skill in the art by referencing the detailed description provided herein.

According to some embodiments of the present disclosure, there is provided a system for setting a driving guide of an electric operating vehicle which may include: a terrain acquisition unit configured to acquire information about a current location of the vehicle, a charging location, an existing terrain, and a current terrain; a calculation unit configured to obtain first information about the vehicle based on the information acquired by the terrain acquisition unit; a battery state estimation unit configured to estimate an amount of available battery power of the vehicle; and a distance/speed calculation unit configured to calculate a drivable distance and drivable speed for the vehicle based on the first information obtained by the calculation unit, the estimated amount of available battery power, and a distance from the current location to a destination of the mission vehicle.

According to an embodiment, the first information may include at least one of a target distance from the current location to the charging location, an estimated fuel efficiency, and a current fuel efficiency.

According to an embodiment, the charging location may differ according to whether a charging source of the vehicle is a charging station or a charging vehicle.

According to an embodiment, the calculation unit may be configured to calculate an estimated fuel efficiency based on the information about the current location of the vehicle and the first information, and the first information may include a target distance from the current location of the vehicle to the charging location.

According to an embodiment, the battery state estimation unit may be configured to calculate the amount of the available battery power based on the information about the charging location and a driving distance margin set for arrival at the destination.

According to an embodiment, the distance/speed calculation unit may be configured to calculate the drivable distance or the drivable speed based on a lower fuel efficiency among an estimated fuel efficiency and a current fuel efficiency of the vehicle calculated by the calculation unit.

According to an embodiment, the vehicle may be configured to be operated according to an input through a user interface selection unit, separately from the expected fuel efficiency and the current fuel efficiency calculated by the calculation unit.

According to an embodiment, the processor may be further configured to implement a learning unit configured to store existing road information and fuel efficiency data for each environment, and information obtained from current driving of the vehicle, and real-time driving information of the vehicle including the drivable distance and the drivable speed calculated by the distance/speed calculation unit may be stored in the learning unit.

According to some embodiments of the present disclosure, there is provided a method for setting a driving guide of an electric operating vehicle. The method may include: a terrain acquisition operation of obtaining information about a driving history of the vehicle and a charging source; a calculation and battery estimation operation of calculating a target distance between a current location of the vehicle and a location of the charging source, an estimated fuel efficiency, and a current fuel efficiency based on the information obtained in the terrain acquisition operation, and calculating an amount of available battery power of the vehicle based on the calculated target distance, estimated fuel efficiency and current fuel efficiency; and a drivable distance/speed calculation operation of calculating a drivable distance and drivable speed of the vehicle based on the calculated target distance, estimated fuel efficiency, current fuel efficiency and amount of the available battery power.

According to an embodiment, the terrain acquisition operation may include: determining whether the driving history comprises information about a current terrain; and determining about the charging source.

According to an embodiment, the determining whether the driving history includes the information about the current terrain may include: acquiring information about the current terrain or information about a pre-stored existing terrain and the current terrain according to whether the driving history includes the information about the current terrain; and acquiring information about an altitude, a road, and an environment of the current terrain.

According to an embodiment, determining about the charging source may include: determining whether the charging source is a charging station or a charging vehicle; and acquiring location information about the charging source.

According to an embodiment, the calculation and battery state estimation operation may include: a calculation operation of calculating an estimated fuel efficiency and a current fuel efficiency based on information about the current location of the vehicle, an environment, the target distance and a destination of the vehicle obtained in the terrain acquisition operation; and a battery state estimation operation of the calculating the amount of the available battery power of the vehicle.

According to an embodiment, the calculation operation may include calculating a distance from the vehicle to the destination.

According to an embodiment, the battery state estimation operation may include: checking whether there is a battery failure; estimating a remaining amount of battery charge in a battery of the vehicle based on a state of charge and a state of health (SOC/SOH) of the battery; determining whether the vehicle is a hybrid vehicle that uses either an internal combustion engine or the battery for driving the vehicle; and calculating the amount of the available battery power based on an amount of battery charge chargeable using an engine and a generator of the hybrid vehicle or a distance margin according to the determining whether the vehicle is the hybrid vehicle.

According to an embodiment, the drivable distance/speed calculation operation may include: comparing the estimated fuel efficiency with the current fuel efficiency of the vehicle; calculating at least one of the drivable distance and the drivable speed based on a lower fuel efficiency between the estimated fuel efficiency and the current fuel efficiency; and calculating an additionally drivable distance by subtracting the target distance from the drivable distance.

According to an embodiment, the method may further include a storage operation for storing and updating road information, fuel efficiency data for each environment including the current fuel efficiency and information obtained from current driving by the vehicle.

According to an embodiment, the storage operation may include: storing a margin value of fuel efficiency or battery power amount according to terrain information; storing fuel efficiency data according to the terrain information; and updating the stored information.

It should be noted that aspects of the present disclosure are not limited to the descriptions provided herein, and other aspects of the present disclosure will be understood by those skilled in the art from the following descriptions.

BRIEF DESCRIPTION OF DRAWINGS

These and/or other aspects will become apparent and more readily appreciated from the following description of the embodiments, taken in conjunction with the accompanying drawings, in which.

DETAILED DESCRIPTION

Embodiments in the present disclosure are all example embodiment, and thus, these embodiments may have various equivalents, substitutes, changes or modifications thereto. These embodiments are not intended to limit the present disclosure thereto.

The terminology used herein is for the purpose of describing particular example embodiments only and is not intended to limit the present disclosure. Singular expressions include plural expressions unless the context clearly dictates otherwise. Herein, the terms such as "comprise" or "have" are intended to specify the presence of stated features, integers, steps, operations, components, parts, or combinations thereof. It should be understood that they do not preclude the possibility of presence or addition of one or more other features, numbers, steps, operations, components, parts, or combinations thereof. As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Unless otherwise defined, all terms used herein, including technical or scientific terms, have the same meaning as commonly understood by one of ordinary skill in the art to which embodiments of the present disclosure belong. The terms such as those defined in commonly used dictionaries are to be interpreted as having a meaning consistent with the meaning of the context in the relevant art. Unless explicitly defined herein, they are not interpreted as an ideal or overly formal meaning.

Hereinafter, the embodiments will be described with reference to the drawings for describing a driving guide setting system of an electric operating mission vehicle and a setting method thereof.

Figure 1:
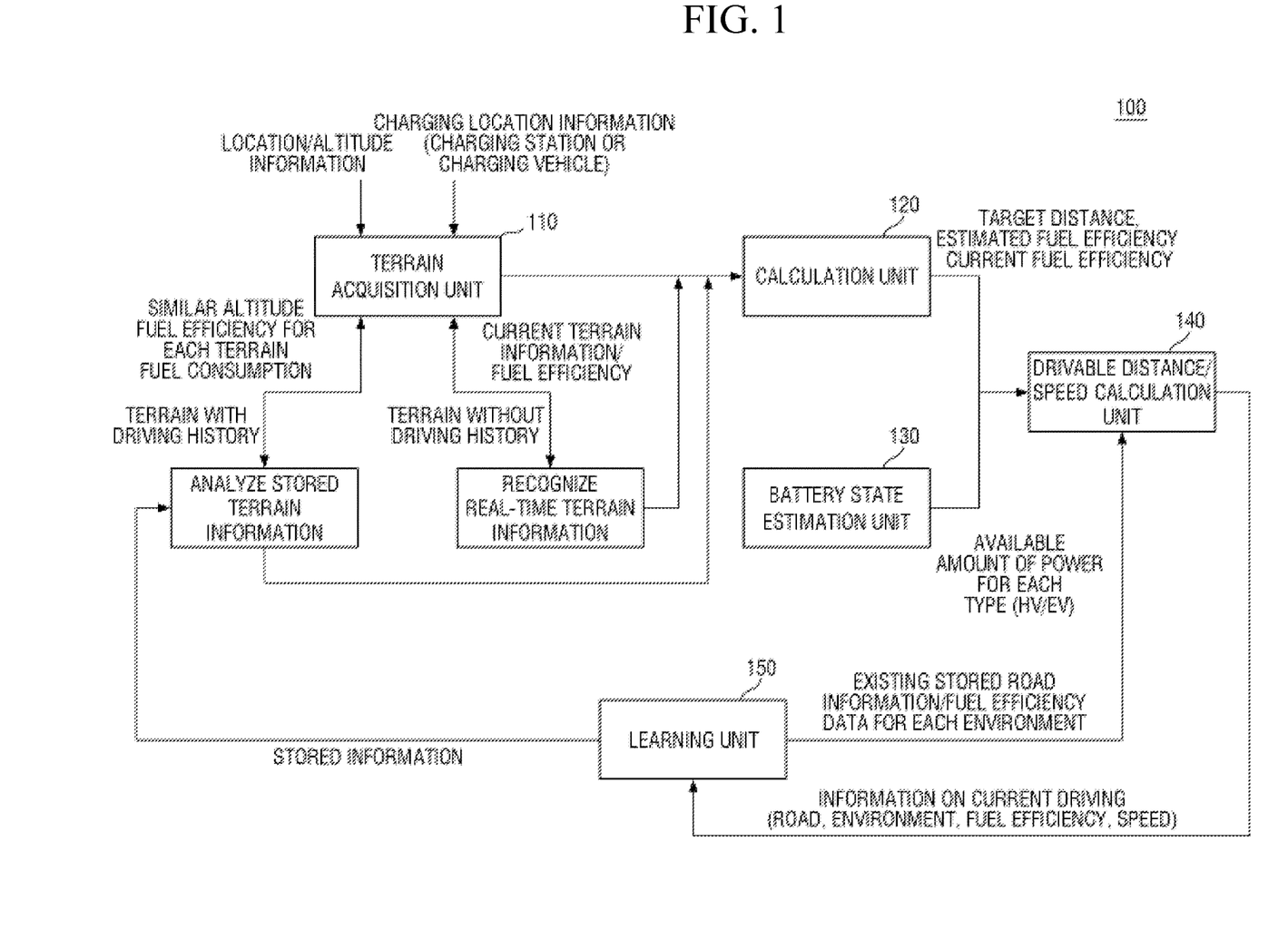
FIG. 1 is a schematic overall configuration diagram of a driving guide setting system of an electric operating mission vehicle, according to an embodiment.

FIG. 1 is a schematic overall configuration diagram of a driving guide setting system of an electric operating mission vehicle, according to an embodiment.

Referring to FIG. 1, a driving guide setting system 100 of an electric operating mission vehicle according to an embodiment may include a terrain acquisition unit 110, a calculation unit 120, a battery state estimation unit 130, and a learning unit 150.

The terrain acquisition unit 110 may be configured to acquire information about a current location and a charging location, an existing terrain, and a current terrain. Here, the information about the current terrain may be real-time terrain information acquired by the mission vehicle while it is being driven in the current terrain.

When the terrain acquisition unit 110 acquires the terrain information described above, different information may be acquired depending on whether the current terrain is included in a driving history of the mission vehicle. For example, if the current terrain is included in the driving history of the mission vehicle, the terrain acquisition unit 110 may acquire existing learned terrain/operation information through a learning unit 150 to be described later. The existing learned terrain/operation information may include information about the existing terrain different from the current terrain. The driving history and the existing learned terrain/operation information may be stored in a memory or a memory device installed in the mission vehicle or a control center of the mission vehicle connected to the mission vehicle in a wired or wireless manner, according to an embodiment.

In contrast, if the current terrain is not included in the driving history of the mission vehicle, terrain information including an altitude and an environment of the current terrain according to the current location of the mission vehicle may be acquired by the terrain acquisition unit 110 on a real-time basis while the mission vehicle is being driven.

The terrain acquisition unit 110 may acquire the information about the charging location according to whether a charging source in the charging location for charging the mission vehicle is a charging station, which is fixed, or a charging vehicle, which moves around.

That is, depending on the type of the charging source of the mission vehicle, i.e., whether the charging source for charging the mission vehicle is the charging station or the charging vehicle, charging location of the mission vehicle may vary. This is a piece of information required when calculating a drivable distance of the mission vehicle, and thus, it is necessary to be able to recognize a distance from the current location to the charging location of the mission vehicle. Therefore, if the charging source for the mission vehicle is the charging station, the location information about the charging station may be acquired by the terrain acquisition unit 110, and if the charging source for the mission vehicle is the charging vehicle, real-time location information about the charging vehicle may be updated and acquired by the terrain acquisition unit 110.

The calculation unit 120 may obtain the above-described various information acquired by the terrain acquisition unit 110, and obtain first information about the mission vehicle. Here, the first information may include at least one of a target distance, which is a distance between the current location of the mission vehicle to the charging location, an estimated fuel efficiency, and a current fuel efficiency which may be a real-time fuel efficiency. For example, the fuel efficiency may be indicated as mileage, not being limited thereto. In more detail, the terrain acquisition unit 110 may provide the calculation unit with the existing terrain information, the current terrain information (real-time terrain information), and the current location information about the mission vehicle, and the charging location information. Accordingly, the calculation unit 120 may calculate the target distance, the estimated fuel efficiency, and the current fuel efficiency based on at least the current terrain information, and may provide information about the calculated distance to a distance/speed calculation unit 140 to be described later. Here, the estimated fuel efficiency may be obtained based on the information about the existing terrain, the current terrain, the target distance and/or other information stored at the learning unit 150 at a beginning of driving the mission vehicle in the current terrain, while the current fuel efficiency is calculated on a real-time basis while the mission vehicle is being driven in the current terrain.

The battery state estimation unit 130 may estimate an amount of available battery power of the mission vehicle according to the type of the mission vehicle. For example, depending on whether the mission vehicle is a hybrid vehicle or not, the amount of the available battery power estimated by the battery state estimation unit 130 may vary.

For example, if the mission vehicle is a hybrid vehicle that is able to either a battery or an internal combustion engine for driving the mission vehicle, the battery state estimation unit 130 may calculate an amount of battery charge (or battery power) chargeable using an engine and/or a generator based on an amount of fuel for the internal combustion engine, and estimate the amount of the available battery power based on the charging location of the mission vehicle and a driving distance margin set for arriving at a destination of the mission vehicle. Further, when the mission vehicle is not a hybrid vehicle but a pure electric vehicle, the battery state estimation unit 130 may estimate the amount of the available battery power based on the charging location of the mission vehicle and the driving distance margin. Here, the destination may be a start location for the mission vehicle to return to, a place different from the start location, or the charging location, according to embodiments The values estimated or calculated by the battery state estimation unit 130 and the calculation unit 120 as described above may be used by a distance/speed calculation unit 140 to be described below.

The distance/speed calculation unit 140 may calculate a drivable speed and a drivable distance based on the values estimated or calculated by the battery state estimation unit 130 and the calculation unit 120, and a distance from the current location to the destination of the mission vehicle. Here, the drivable speed and the drivable distance may be a speed limit and a distance limit, or maximum allowed speed and a maximum allowed distance, respectively, according to embodiments.

For example, the distance/speed calculation unit 140 may calculate an additionally drivable distance based on the information about the target distance, the estimated fuel efficiency, the current fuel efficiency, and the amount of the available battery power. Here, the additionally drivable distance may be an additional or additionally allowed distance limit for the mission vehicle. Further, the distance/speed calculation unit 140 may calculate a speed limit from existing fuel efficiency data, and calculate the drivable speed based on the current fuel efficiency and the current environment information.

For a stable operation of the mission vehicle, the distance/speed calculation unit 140 may compare the expected fuel efficiency with the current fuel efficiency, and calculate a drivable distance or a speed limit of the mission vehicle based on a lower fuel efficiency between the expected fuel efficiency and the current fuel efficiency.

In contrast, the mission vehicle may be provided with a user interface selection unit (not shown). For example, speed for the stable operation of the mission vehicle may be calculated by the distance/speed calculation unit 140, but the mission vehicle may require high speed such as fast movement or escape, rather than maintaining speed for the stable operation. Accordingly, a driver (or operator) can implement selection for fast movement of the mission vehicle through the user interface selection unit. When the mission vehicle implements fast movement, the mission vehicle may be operated according to the user interface selection unit separately from the expected fuel efficiency and the current fuel efficiency. When the mission vehicle is operated fast through the user interface selection unit as described above, the distance/speed calculation unit 140 may calculate a drivable distance of the mission vehicle corresponding to the fast speed as well as the values estimated or calculated by the calculation unit 120 and the battery state estimation unit 130.

The drivable distance and the speed limit of the mission vehicle calculated by the distance/speed calculation unit 140 may be transmitted to the driver and a driving control unit (not shown). Further, the values calculated by the distance/speed calculation unit 140 may be provided to and stored in the learning unit 150 to be described later.

The learning unit 150 may store real-time driving information calculated by the distance/speed calculation unit 140. For example, the learning unit 150 may store existing road information and fuel efficiency data for each environment, and may store information according to current driving, such as terrain information, environmental information, a fuel efficiency such as an expected fuel efficiency and a current fuel efficiency, and speed for a stable operation, etc.

Further, the data stored in the learning unit 150 may be provided to the distance/speed calculation unit 140 when the mission vehicle performs a real-time mission later, and may be used when calculating a drivable distance of the mission vehicle and speed for a stable operation.

Accordingly, the terrain information stored in the learning unit 150 may be provided to the terrain acquisition unit 110 and used to analyze the stored terrain information, and the existing road information and fuel efficiency data for each environment stored in the learning unit 150 may be provided to the distance/speed calculation unit 140 and used. Further, information according to the current driving, for example, road, environment, fuel efficiency and speed may be stored and updated at the learning unit 150.

Figure 2:
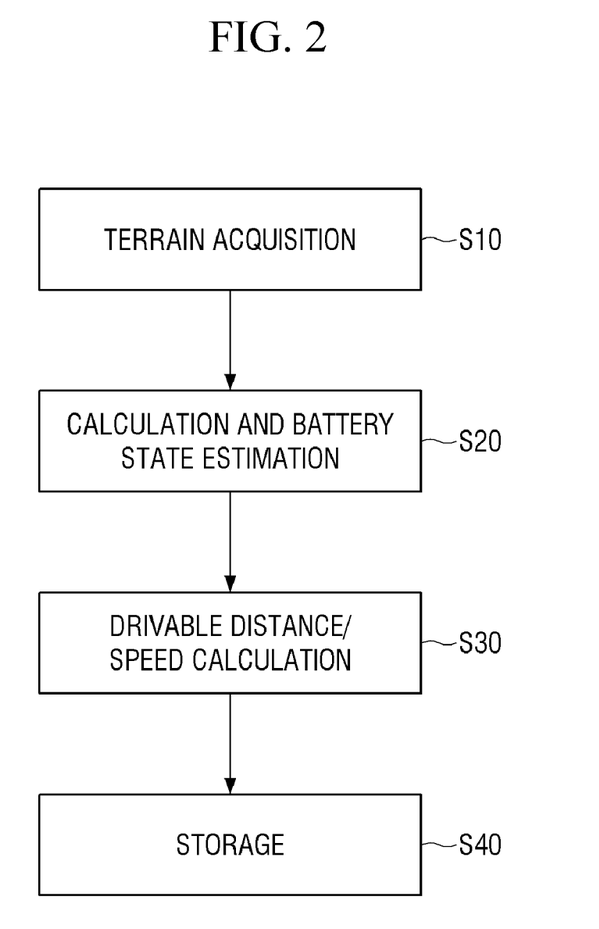
FIG. 2 is a flowchart of a driving guide setting method of an electric operating mission vehicle, according to an embodiment.

FIG. 2 is a flowchart of a driving guide setting method of an electric operating mission vehicle, according to an embodiment.

Referring to FIG. 2, a driving guide setting method of an electric operating mission vehicle according to an embodiment may include a terrain acquisition operation (S10), a calculation and battery state estimation operation (S20), a drivable distance/speed calculation operation (S30), and a storing operation (S40).

The mission vehicle may obtain driving history information about the mission vehicle and charging source information through the learning unit 150 and a real-time operation of the mission vehicle (terrain acquisition operation S10).

The mission vehicle may calculate a target distance from a current location of the mission vehicle to a location of the charging source, an estimated fuel efficiency, and a current fuel efficiency through the obtained information, and calculate an amount of available battery power of the mission vehicle (calculation and battery state estimation operation S20).

The calculated information such as the target distance, the fuel efficiencies of the mission vehicle, and the amount of the available battery power may be used by the distance/speed calculation unit 140 to calculate a drivable distance and speed of the mission vehicle (drivable distance/speed calculation operation S30).

Existing information about the mission vehicle and real-time information about the mission vehicle including the calculated drivable distance and speed may be stored in the learning unit (storing operation S40).

Figure 3:
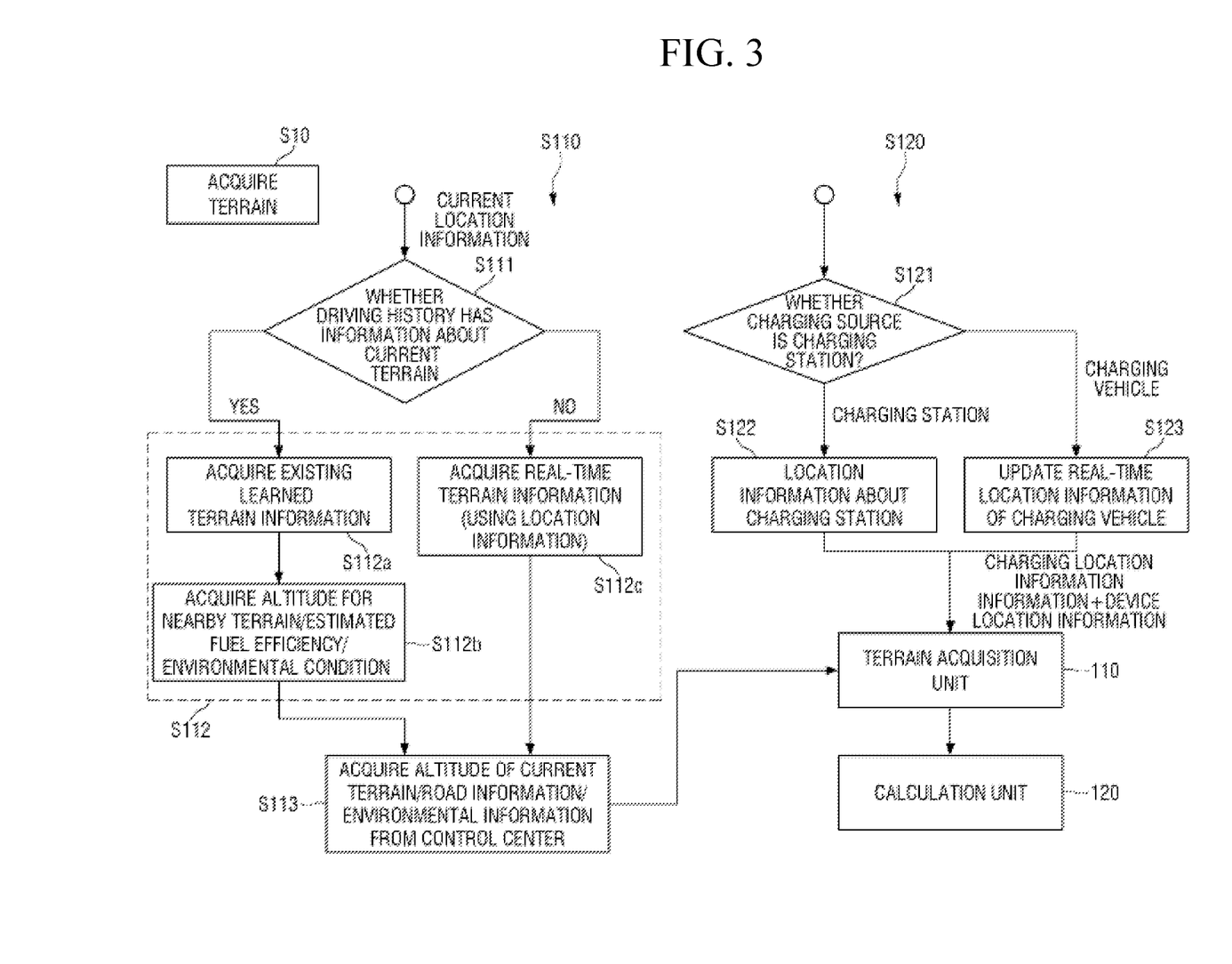
FIG. 3 is a flowchart of a terrain acquisition step in a driving guide setting method of an electric operating mission vehicle, according to an embodiment.

FIG. 3 is a flowchart of a terrain acquisition operation in a driving guide setting method of an electric operating mission vehicle, according to an embodiment.

Referring to FIG. 3, the terrain acquisition operation S10 of FIG. 2 may include determining about the driving history of the mission vehicle (S110) and determining a type of the charging source (S120). Results of these operations of S110 and S120 may be used by the calculation unit 120.

The operation of determining about the driving history (S110) may include an operation of determining whether a current terrain is in included in the driving history of the mission vehicle (S111), an operation of acquiring terrain information (S112), and an operation of acquiring real-time operating information (S113).

When determining about the driving history (S111), if the current terrain is determined to be included in the driving history of the mission vehicle, existing learned terrain information about the current terrain may be acquired (S112a), and information about an altitude of a nearby terrain, an expected fuel efficiency and environmental conditions about the nearby terrain may be acquired (S112b). In contrast, if the current terrain is not included in the driving history of the mission vehicle, current terrain information may be acquired on a real-time basis (S112c) by using information about the current location of the mission vehicle (terrain information acquisition operation S112).

In addition, an altitude, road information and environmental information about the current terrain of the mission vehicle may also be acquired from the control center (operation information acquisition operation S113).

The driving history information obtained as described above may be used by the terrain acquisition unit 110 of the mission vehicle.

The information about the mission vehicle obtained by the terrain acquisition unit 110 may include not only the driving history information but also location information about a charging source. That is, the information about the charging source may also be obtained and used by the terrain acquisition unit 110 of the mission vehicle.

In addition to determining about the driving history (S110), a type of the charging source is also determined (S120) (charging source determination operation S120).

The charging source determination operation S120 may include determining the type of the charging source (S121) and obtaining the location information about the charging source, that is, a charging location (S122, S123).

In determining about the charging source, it is determined whether the charging source is a charging station or a charging vehicle (charging source determination operation S121). For example, if the charging source is a charging station, location information about the charging station is obtained (charging station location information determination operation S122). However, if the charging source is a charging vehicle, location information about the charging vehicle is obtained while the current location of the charging vehicle is updated (charging vehicle location information determination operation S123).

Results from the determining about the charging source may be used by the terrain acquisition unit 110 of the mission vehicle.

Figure 4:
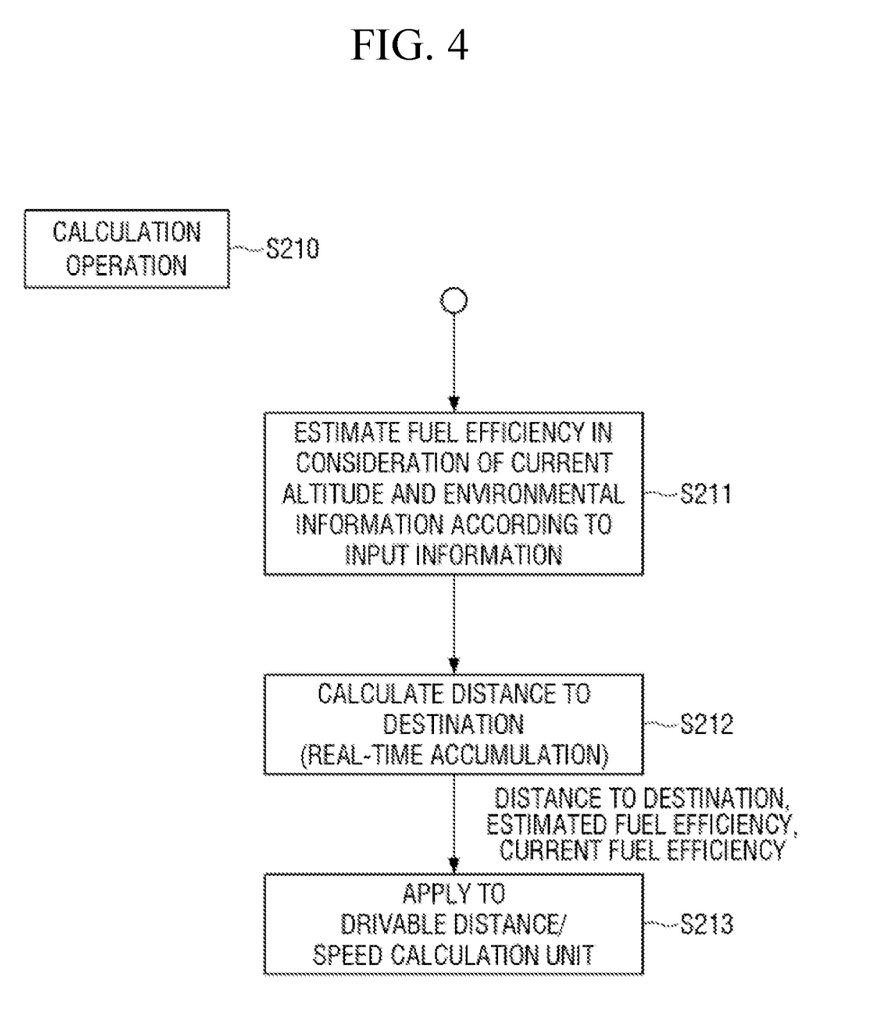
FIG. 4 is a flowchart of various calculation operations in a driving guide setting method of an electric operating mission vehicle, according to an embodiment.
Figure 5:
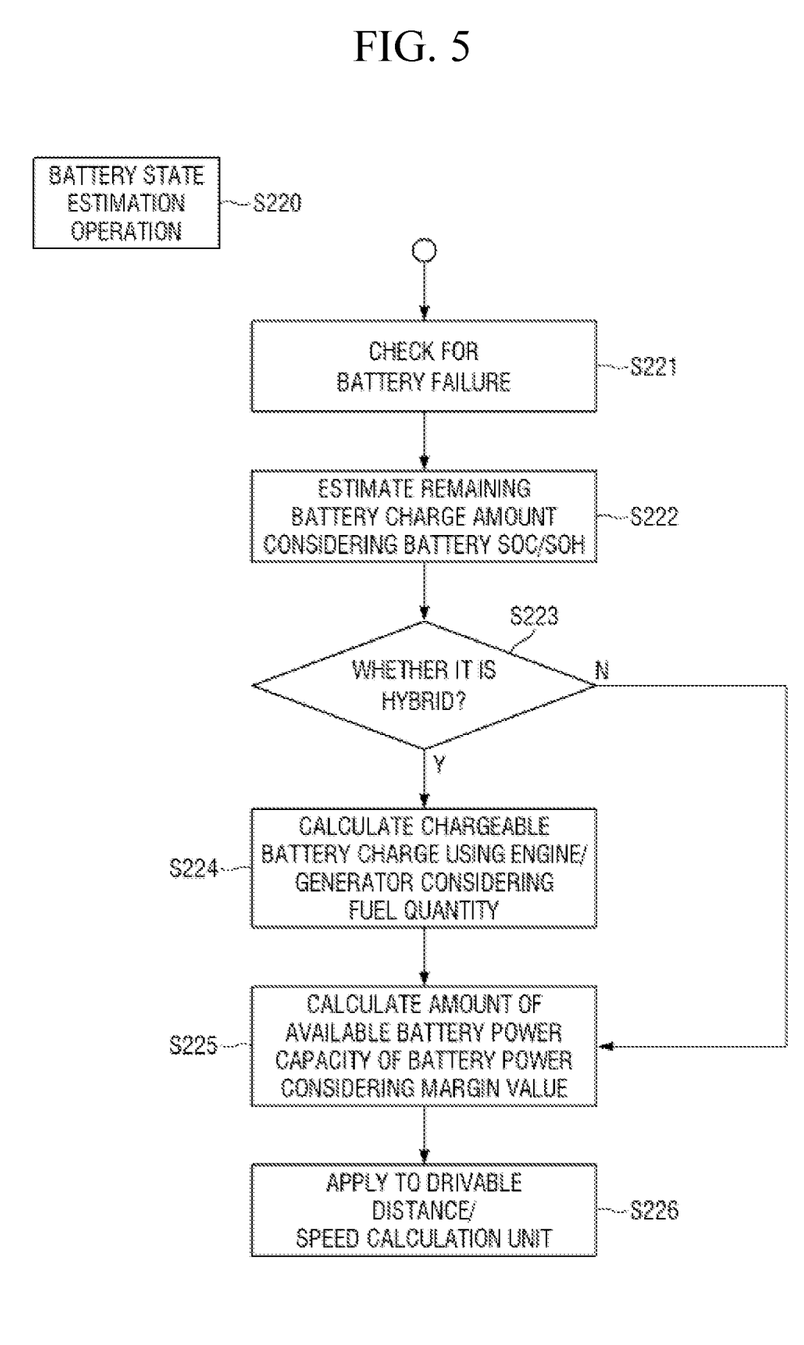
FIG. 5 is a flowchart of an operation of battery state estimation in a driving guide setting method of an electric operating mission vehicle, according to an embodiment.

FIG. 4 is a flowchart of various calculation operations performed in a driving guide setting method of an electric operating mission vehicle, according to an embodiment. FIG. 5 is a flowchart of an operation of battery state estimation in a driving guide setting method of an electric operating mission vehicle, according to an embodiment.

Referring to FIGS. 4 and 5, the calculation and battery state estimation operation S20 shown in FIG. 2 may include a calculation operation S210 and a battery state estimation operation S220.

The information obtained from the terrain acquisition unit 110 may be used by the calculation unit 120, and the calculation unit 120 may consider the information about the current location of the mission vehicle and environmental information to calculate a fuel efficiency, such as an estimated fuel efficiency and a current fuel efficiency, as well as a target distance from the current location to the charging location and a distance from the current location to a destination of the mission vehicle, which may be a start location for the mission vehicle to return to (calculation operation S210).

The calculation operation S210 may include a fuel efficiency estimation operation S211, a distance calculation operation S212, and an operation S213 of using the calculated distance at the drivable distance/speed calculation unit 140.

The calculation unit 120 obtains various information acquire at the terrain acquisition unit 110 to calculate the estimated fuel efficiency and the current fuel efficiency based on the information about the current location of the mission vehicle and environmental information (fuel efficiency estimation operation S211).

After estimating the fuel efficiencies, the mission vehicle may calculate the target distance from the current location to the charging location, and the distance from the current location to the destination (distance calculation operation S212).

The distance to the destination, the estimated fuel efficiency, or the current fuel efficiency calculated by the calculation unit 120 may be used by the drivable distance/speed calculation unit 140 (distance/speed calculation operation S213).

Along with the calculation operations by the calculation unit 120, the battery state estimation unit 130 may estimate an amount of available battery power of the mission vehicle (battery state estimation operation S220).

The battery state estimation operation S220 may include a battery checking operation S221, an operation of estimating an amount of remaining battery charge S222, an operation of determining about a driving unit of the mission vehicle S223, and an operation of calculating an amount of available battery power S224, S225, and may include an operation of applying the calculation results to the drivable distance/speed calculation unit 140.

As described above in reference to FIG. 1, for the battery state estimation operation the battery state is checked (battery checking operation S221). For example, it checks a battery failure. An amount of remaining battery charge may also be estimated based on a state of charge and a state of health (SOC/SOH) of the battery (remaining battery charge estimation operation S222). Further, in order to reflect the type of the mission vehicle, the driving unit of the mission vehicle is determined, for example, whether it is a hybrid vehicle or not (mission vehicle driving unit determination operation S223). For example, if the mission vehicle is a hybrid vehicle, an amount of available battery power is estimated by reflecting not only the battery but also an amount of battery charge (or battery power) chargeable using an engine and/or a generator (operation of calculating chargeable battery capacity using engine/generator based on fuel quantity S224).

If the mission vehicle is a non-hybrid vehicle, the available amount of battery power is estimated.

After determining about the driving unit of the mission vehicle, the amount of battery charge chargeable by the engine/generator is determined depending on the type of the driving unit of the mission vehicle (S224), and the amount of the available battery power considering a driving distance margin is calculated (amount of available battery power calculation operation S225). That is, regardless of whether the mission vehicle is a hybrid vehicle, a stable operation can be provided even when driving further than a planned distance or driving at speed faster than a planned speed by calculating the available amount of the battery power considering the driving distance margin.

Figure 6:
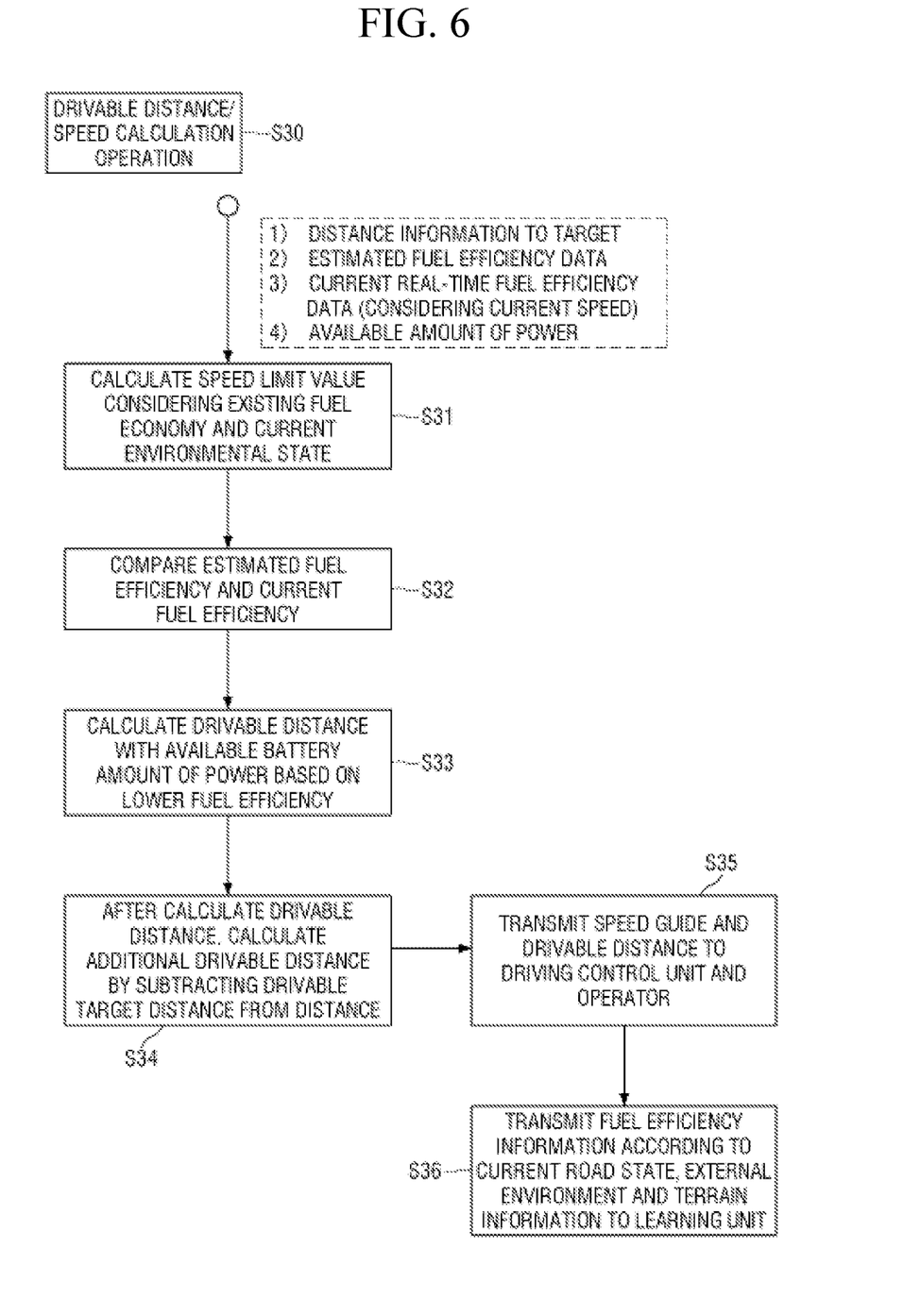
FIG. 6 is a flowchart of a drivable distance/speed calculation operation in a driving guide setting method of an electric operating mission vehicle, according to an embodiment.

FIG. 6 is a flowchart of a drivable distance/speed calculation operation in a driving guide setting method of an electric operating mission vehicle, according to an embodiment.

Referring to FIG. 6, the information estimated or calculated in the calculation and battery state estimation operation (S20) are used by the distance/speed calculation unit 140 to calculate a drivable distance and speed (drivable distance/speed calculation operation S30).

The drivable distance/speed calculation operation S30 may include calculating a speed limit (S31), comparing fuel efficiencies (S32), calculating a drivable distance (S33), calculating an additionally drivable distance (S34), and transmitting them to a driving control unit and a driver (S35). Further, an operation of applying the calculated values to the learning unit (S36) may be included.

In the drivable distance/speed calculation operation, a speed limit is calculated considering an existing fuel efficiency of the mission vehicle and a current environmental state, for example, road surface conditions such as whether it rains, whether it is a field, or whether it is a road (speed limit value calculation operation S31). At this time, the calculated speed limit may include optimal speed among various speed data based on the existing fuel efficiency data. At this time, an additionally movable distance may also be calculated based on the target distance, the expected fuel efficiency, the current fuel efficiency, and the amount of the available battery power acquired in the previous operations. Further, an optimal speed limit may be calculated from the existing fuel efficiency data, and a speed limit may be calculated based on the current fuel efficiency and current environmental information.

After calculating the speed limit, the estimated fuel efficiency and the current fuel efficiency of the mission vehicle are compared to each other (fuel efficiency comparison operation S32).

After the comparison, the drivable distance according to the amount of the available battery power may be calculated based on the lower fuel efficiency between the estimated fuel efficiency and the current fuel efficiency (movable distance calculation operation S33).

After calculating the drivable distance, an additionally drivable distance obtained by subtracting the target distance from the drivable distance may be calculated (additionally drivable distance calculating operation S34).

However, after comparing the expected fuel efficiency with the current fuel efficiency, the drivable distance or the speed limit may be calculated based on the lower fuel economy for a stable operation of the mission vehicle. However, when fast movement or escape is a priority rather than the stable operation of the mission vehicle, it is also possible to select a different speed limit through the user interface selection unit.

The speed limit, the drivable distance, and the additionally drivable distance, may be provided to the driving control unit of the mission vehicle and the driver of the mission vehicle (operation of transmitting to the driving control unit and the operator S35).

Further, fuel efficiency information according to the current road state, external environment, and terrain information may be transmitted to the learning unit 150 (operation of transmitting to the learning unit 150 S36).

Figure 7:
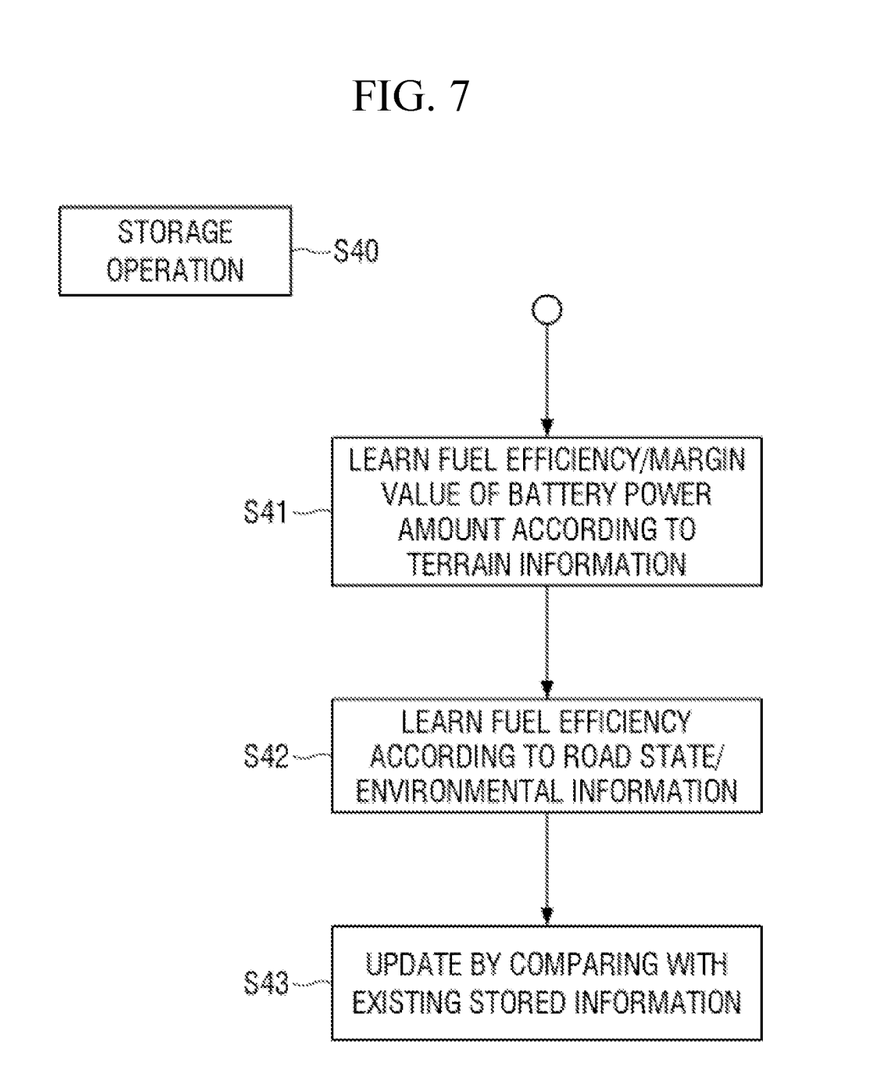
FIG. 7 is a flowchart of a storing operation using a learning unit in a driving guide setting method of an electric operating mission vehicle, according to an embodiment.

FIG. 7 is a flowchart of a storing operation using a learning unit in a driving guide setting method of an electric operating mission vehicle, according to an embodiment.

Referring to FIG. 7, the various information estimated or calculated by the distance/speed calculation unit 140 may be stored in the learning unit 150 (learning unit storage operation S40). The drivable distance, the speed limit, the existing road information, the fuel efficiencies in each environment, and the various information including the current terrain information according to current driving may be stored or updated in the learning unit 150 (learning unit 150 storage operation S40).

The learning unit storage operation may include an operation S41 of storing a margin value of fuel efficiency and/or battery power amount according to terrain information, an operation of storing fuel efficiency according to the state of road surface/environmental information to be driven or driven by the mission vehicle, and operation S42 of comparing the information input in real time with the existing information, and updating the existing information.

As described above, the driving guide setting system 100 shown in FIG. 1 includes a terrain acquisition unit 110, a calculation unit 120, a battery state estimation unit 130, a distance/speed calculation unit 140, and a learning unit 150, and the terrain acquisition unit 110 may acquire the existing terrain information and current (real-time) terrain information based on the information about the current location and the charging location, and provide the information to the calculation unit 120, and the calculation unit 120 may calculate and provide the target distance between the current location and the charging location, the expected fuel efficiency, and the current (real-time) current fuel efficiency based on the information about the current terrain to the drivable distance/speed calculation unit 140, and the battery state estimation unit 130 may calculate the amount of available battery power according to the type of the mission vehicle. Further, the distance/speed calculation unit 140 may reflect the distance to the destination in calculating an optimal speed limit and a drivable distance based on the existing fuel efficiency data and the current environmental states. This is recognized by the driver and the driving control unit, and the mission vehicle can be operated based on the maximum allowable speed and distance. In addition, the information calculated in this way is stored and update by the learning unit 150, so that the information can be used when performing a mission at a later time.

The driving guide setting system 100 of the mission vehicle and the driving guide setting method according to the embodiments as described above have an advantage, in which the drivable distance and the drivable speed can be provided based on the information about the current terrain, the target distance, the expected fuel efficiency and the current (real-time) fuel efficiency, and accordingly, the amount of available battery power of the mission vehicle can be calculated.

Further, the driving guide setting system 100 of the electric operating mission vehicle and the setting method thereof according to the embodiments can calculate the optimal speed limit and the drivable distance considering existing fuel efficiency information and current environmental states based on the calculated amount of the available battery power of the mission vehicle, and have an advantage in that the mission vehicle can be operated based on the maximum allowable speed/distance according to the above information.

In addition, the driving guide setting system 100 of the electric operating mission vehicle and the drive guide setting method thereof according to the embodiments have an advantage, in which the calculated information is stored and updated in the learning unit 150, and accordingly the stored/update information can be utilized when performing a mission at a later time.

At least one of the components, elements, modules or units (collectively "units" in this paragraph) represented by a block in the drawings including FIG. 1 may be embodied as various numbers of hardware, software and/or firmware structures that execute respective functions described above, according to an exemplary embodiment. For example, at least one of these units may use a direct circuit structure, such as a memory, a processor, a logic circuit, a look-up table, etc. that may execute the respective functions through controls of one or more microprocessors or other control apparatuses. Also, at least one of these units may be specifically embodied by a module, a program, or a part of code, which contains one or more executable instructions for performing specified logic functions, and executed by one or more microprocessors or other control apparatuses. Further, at least one of these units may include or may be implemented by a processor such as a central processing unit (CPU) that performs the respective functions, a microprocessor, or the like. Two or more of these units may be combined into one single unit which performs all operations or functions of the combined two or more units. Also, at least part of functions of at least one of these units may be performed by another of these units. Further, although a bus is not illustrated in the above block diagrams, communication between the components may be performed through the bus.

The operations of the methods or algorithms described above can be embodied as computer readable codes on a computer readable recording medium, or to be transmitted through a transmission medium. The computer readable recording medium is any data storage device that can store data which can be thereafter read by a computer system. Examples of the computer readable recording medium include read-only memory (ROM), random-access memory (RAM), compact disc (CD)-ROM, digital versatile disc (DVD), magnetic tape, floppy disk, and optical data storage device, not being limited thereto. The transmission medium can include carrier waves transmitted through the Internet or various types of communication channel. The computer readable recording medium can also be distributed over network coupled computer systems so that the computer readable code is stored and executed in a distributed fashion.

Embodiments of the present disclosure have been described above with reference to the accompanying drawings, but those of ordinary skill in the art to which the present disclosure pertains should understand that the present disclosure may be practiced in other specific forms without changing the technical idea or essential features thereof. Therefore, the embodiments described above are illustrative in all aspects and should not be understood as limiting.

What is claimed is:

1. A system for setting a driving guide of an electric vehicle comprising at least one processor configured to implement:
    a terrain acquisition unit configured to acquire information about a current location of the vehicle, a charging location, an existing terrain, and a current terrain, the information about the current terrain being real-time terrain information about the vehicle currently being driven;
    a calculation unit configured to obtain first information about the vehicle based on the information acquired by the terrain acquisition unit;
    a battery state estimation unit configured to estimate an amount of available battery power of the vehicle; and
    a distance/speed calculation unit configured to calculate a drivable distance and drivable speed for the vehicle based on the first information obtained by the calculation unit, the estimated amount of available battery power, and a distance from the current location to a destination of the vehicle.

2. The system of claim 1, wherein the first information comprises at least one of a target distance from the current location to the charging location, an estimated fuel efficiency, and a current fuel efficiency.

3. The system of claim 1, wherein the charging location differs according to whether a charging source of the vehicle is a charging station or a charging vehicle.

4. The system of claim 3, wherein the calculation unit is configured to calculate an estimated fuel efficiency based on the information about the current location of the vehicle and the first information,
    wherein the first information comprises a target distance from the current location of the vehicle to the charging location.

5. The system of claim 4, wherein the processor is further configured to implement a user interface selection unit, and
    wherein the vehicle is configured to be operated according to an input through the user interface selection unit, separately from an expected fuel efficiency and a current fuel efficiency calculated by the calculation unit.

6. The system of claim 3, wherein the battery state estimation unit is configured to calculate the amount of the available battery power based on the information about the charging location and a driving distance margin set for arrival at the destination.

7. The system of claim 1, wherein the distance/speed calculation unit is configured to calculate the drivable distance or the drivable speed based on a lower fuel efficiency among an estimated fuel efficiency and a current fuel efficiency of the vehicle calculated by the calculation unit.

8. The system of claim 1, wherein the processor is further configured to implement a learning unit configured to store existing road information and fuel efficiency data for each environment, and information obtained from current driving of the vehicle, and
    wherein real-time driving information about the vehicle including the drivable distance and the drivable speed calculated by the distance/speed calculation unit is stored in the learning unit.

9. A method for setting a driving guide of an electric vehicle comprising:
    a terrain acquisition operation of obtaining information about a driving history of the vehicle and a charging source;
    a calculation and battery estimation operation of calculating a target distance between a current location of the vehicle and a location of the charging source, an estimated fuel efficiency, and a current fuel efficiency based on the information obtained in the terrain acquisition operation, the current fuel efficiency being calculated in real time in the vehicle being driven; and
    calculating an amount of available battery power of the vehicle based on the calculated target distance, estimated fuel efficiency and current fuel efficiency; and
    a drivable distance/speed calculation operation of calculating a drivable distance and drivable speed of the vehicle based on the calculated target distance, estimated fuel efficiency, current fuel efficiency and amount of the available battery power.

10. The method of claim 9, wherein the terrain acquisition operation comprises:

determining whether the driving history comprises information about a current terrain; and
determining about the charging source.

11. The method of claim 10, wherein the determining whether the driving history comprises the information about the current terrain comprises:
  acquiring information about the current terrain or information about a pre-stored existing terrain and the current terrain according to whether the driving history comprises the information about the current terrain; and
  acquiring information about an altitude, a road, and an environment of the current terrain.

12. The method of claim 10, wherein determining about the charging source comprises:
  determining whether the charging source is a charging station or a charging vehicle; and
  acquiring location information about the charging source.

13. The method of claim 9, wherein the calculation and battery state estimation operation comprises:
  a calculation operation of calculating an estimated fuel efficiency and a current fuel efficiency based on information about the current location of the vehicle, an environment, the target distance and a destination of the vehicle obtained in the terrain acquisition operation; and
  a battery state estimation operation of the calculating the amount of the available battery power of the vehicle.

14. The method of claim 13, wherein the calculation operation further comprises calculating a distance from the vehicle to the destination.

15. The method of claim 13, wherein the battery state estimation operation comprises:
  checking whether there is a battery failure;
  estimating a remaining amount of battery charge in a battery of the vehicle based on a state of charge and a state of health (SOC/SOH) of the battery;
  determining whether the vehicle is a hybrid vehicle that uses either an internal combustion engine or the battery for driving the vehicle; and
  calculating the amount of the available battery power based on an amount of battery charge chargeable using an engine and a generator of the hybrid vehicle or a distance margin according to the determining whether the vehicle is the hybrid vehicle.

16. The method of claim 9, wherein the drivable distance/speed calculation operation comprises:
  comparing the estimated fuel efficiency with the current fuel efficiency of the vehicle;
  calculating at least one of the drivable distance and the drivable speed based on a lower fuel efficiency between the estimated fuel efficiency and the current fuel efficiency; and
  calculating an additionally drivable distance by subtracting the target distance from the drivable distance.

17. The method of claim 9, further comprising a storage operation for storing and updating road information, fuel efficiency data for each environment including the current fuel efficiency and information obtained from current driving by the vehicle.

18. The method of claim 17, wherein the storage operation comprises,
  storing a margin value of fuel efficiency or battery power amount according to terrain information;
  storing fuel efficiency data according to the terrain information; and
  updating the stored information.

19. A driving guide setting system for an electric vehicle, the system comprising at least one processor configured to:
  calculate a current fuel efficiency and a target distance from a current location of the vehicle to a charging location, the current fuel efficiency being calculated in real time in the vehicle being driven;
  estimate an amount of available battery power of the vehicle based on the calculated current fuel efficiency and target distance; and
  calculate at least one of a distance limit and a speed limit for the vehicle to arrive at a destination of the vehicle, based on the amount of the available battery power.

20. The system of claim 19, wherein the processor is further configured to calculate an estimated fuel efficiency, and calculate at least one of the distance limit and the speed limit based on a lower fuel efficiency between the estimated fuel efficiency and the current fuel efficiency.

* * * * *